[15] 3,636,333
[45] Jan. 18, 1972

Klund

[54] FOURIER COEFFICIENT GENERATOR
[72] Inventor: William E. Klund, San Diego, Calif.
[73] Assignee: The United States of America as represented by the Secretary of the Navy
[22] Filed: Jan. 28, 1970
[21] Appl. No.: 6,620

[52] U.S. Cl. ............................................235/156, 324/77 H
[51] Int. Cl. .........................................G06f 7/38, G06f 15/34
[58] Field of Search..................235/156, 181, 197; 324/77 G, 324/77 H; 340/15.5 DD

[56] References Cited

UNITED STATES PATENTS

| | | | |
|---|---|---|---|
| 3,517,173 | 6/1970 | Gilmartin, Jr. et al................. | 235/156 |
| 3,087,674 | 4/1963 | Cunningham et al.................. | 235/197 |
| 3,344,349 | 9/1967 | Schroeder............................ | 324/77 H |
| 3,515,990 | 6/1970 | Robertson............................ | 324/77 G |

FOREIGN PATENTS OR APPLICATIONS 797,057  6/1958  Great Britain ........................324/77 G

OTHER PUBLICATIONS

Shively, A Digital Processor To Generate Spectra in Real Time, IEEE Tran. on Computers, Vol. C– 17, No. 5, May 1968, pp. 485– 491.

Primary Examiner—Malcolm A. Morrison
Assistant Examiner—David H. Malzahn
Attorney—R. S. Sciascia, George J. Rubens, J. W. McLaren and T. L. Styner

[57] ABSTRACT

Any time segment of a time-varying waveform may be expressed in terms of a Fourier series. That is knowledge of the complex-amplitude frequency spectrum of the waveform, which is identical to knowledge of the Fourier series coefficients for the waveform segment, enable one to reconstruct the waveform over the time segment in question. This invention is an improved method for generating the Fourier series coefficients corresponding to such a waveform segment.

4 Claims, 4 Drawing Figures

FOURIER COEFFICIENT GENERATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In many arts and scientific fields it has been found convenient to view functions of time, $f(t)$, in terms of their frequency content or as functions of frequency, $F(\omega)$, the general Fourier integral transformation being $$F(\omega) = \int_{-\infty}^{\infty} f(t) e^{-j\omega t} dt$$

More specifically, if the time segment of $f(t)$ which is of interest is not of infinite duration, $F(\omega)$ degenerates into a line spectrum and $f(t)$ may be represented in terms of a Fourier series $$f(t) = \frac{a_0}{2} + \sum_{n=1}^{\infty} a_n \cos \omega_n t + \sum_{n=1}^{\infty} b_n \sin \omega_n t$$

where $a_n$ = Fourier cosine coefficients ($n = 0, 1, 2, \ldots \infty$)
$b_n$ = Fourier sine coefficients ($n = 1, 2, \ldots \infty$)
$\omega_n = \frac{2n\pi}{T}$ where T is the duration of $f(t)$ It is thus possible to express $$a_n = \frac{2}{T} \int_0^T f(t) \cos \frac{2n\pi t}{T} dt$$

$$b_n = \frac{2}{T} \int_0^T f(t) \sin \frac{2n\pi t}{T} dt$$

Furthermore, if all significant frequency components of $f(t)$ lie within a bandwidth W, it is possible to sample $f(t)$ at any rate not less than 2W without loss of information. Hence $a_n$ and $b_n$ may be computed exactly from samples of $f(t)$ and samples of sinusoidal functions.

The object of this invention is to provide a simple reliable computer for multiplying sample points of a time function by stored sample points of a sinusoid in rapid succession and to sum appropriate products so as to generate a series of Fourier coefficients indicative of the original time function.

SUMMARY OF THE INVENTION

A segment of the analog signal $f(t)$ is first sampled at regular intervals and the samples are each converted to a digitally encoded form. Each value is then multiplied by the digital equivalent of a series of sample voltages obtained from a cosine storage device. The successive digital samples of the signal segment are multiplied in rapid succession by respective successive samples of a fundamental frequency cosine wave from a cosine storage device. The multiplications are integrated by summing, in an accumulator, and reading out a number which is equivalent to the Fourier coefficient $a_1$. To obtain the $a_2$ coefficient, the process is repeated with multiplication by sampled readouts of a double frequency cosine wave from the cosine storage device. The process is continued until all harmonics have been processed. The $b_n$ coefficient are evaluated in similar fashion using a sine storage device.

The samples of the cosine and sine waves of frequency $f$, $2f$, $3f$, —$nf$, are uniquely obtained from respective single cycle storage devices merely by instructing readout switching equipment to skip 0, 1, 2, 3, or $n$ samples in the store; but with the readout and multiplication rates remaining constant.

Other objects and features of the invention will become apparent to those skilled in the art by referring to the specific embodiment described in the following specification and shown in the accompanying drawing in which:

DESCRIPTION OF THE PREFERRED EMBODIMENT

Figure 1:
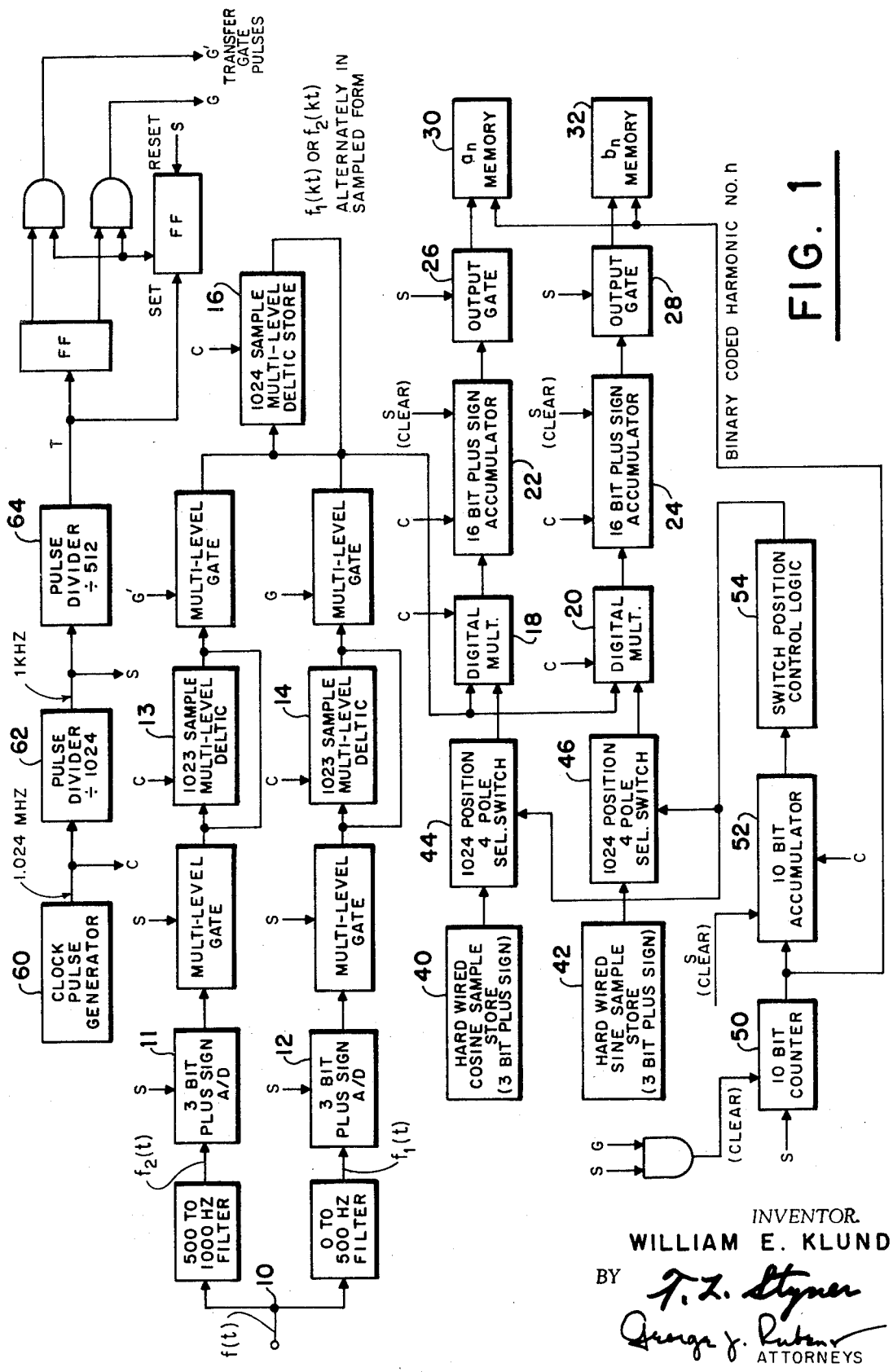
FIG. 1 is a block diagram of an elementary form of the computer of this invention.

The electrical signal representative of the time function $f(t)$ is received on input terminal 10 of FIG. 1. It is filtered to two 500 Hz. bands, $f_1(t)$ and $f_2(t)$, for convenience in reducing the required sample rate to 1 kHz. for each band. Each part of the analog signal is then conventionally sampled at a frequency of at least twice the bandwidth. The amplitude samples are converted to digital form at 11 and 12.

Many transducer signals or real time sensor voltages have time bases that are excessive compared to the analysis time which is available for real time operation. Many reasons may be stated for time compressing the raw signals. One device, 13 or 14, employed here is the so-called Deltic or delay line time compressor in which samples fed into the input are stepped at clock frequency through successive stages of a multilevel register and are continuously fed back and recirculated until the register is filled with a time compressed sampled segment of the input signal, the useless time between real time samples having been discarded. Preparatory to a computational operation the entire content of the delay line time compressor, 13 or 14, is transferred to the Deltic store 16 from which it can be successively repeated and fed sample by sample at clock frequency into the multipliers 18 and 20.

In the multiplier 18 the sampled signal function, $f_1(k)$ or $f_2(kt$ (where $k$ is the time compression factor of the Deltic) is multiplied by the sampled cosinusoid cos $(kn\omega t)$. The product at the output of multiplier 18 can now be designated as the sampled function, $f(kt) \cos (kn\omega t)$, where $n$ is, as stated, the harmonic number of the fundamental frequency $f$, or one of the other harmonics $2f$, $3f$—$nf$ obtained locally from the cosine store. This multiplication is, according to an important feature of this invention, repeated rapidly for different $n$ numbers, and the series of products are added or integrated for each $n$ in the accumulator 22 for the time $1/k$ required for processing the selected real time raw signal sample of duration T. The output gate 26 admits the coefficient $a_n$ to the memory 30 where it is held until updated by the next raw signal sample of duration T.

To obtain $b_n$, the multiplying process is repeated in multiplier 20, employing sin $(kn\omega t)$ and is integrated in accumulator 24. The resulting $b_n$ is gated out at 28 to the memory 32.

Figure 2:
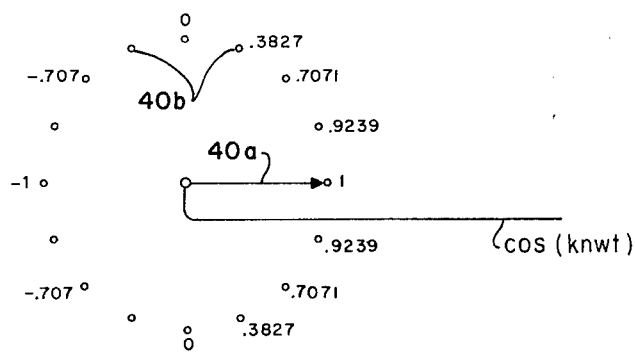
FIG. 2 is a schematic circuit diagram of the cosine store out of which may be read the sinusoidal functions employed in the computer of FIG. 1.
Figure 3:
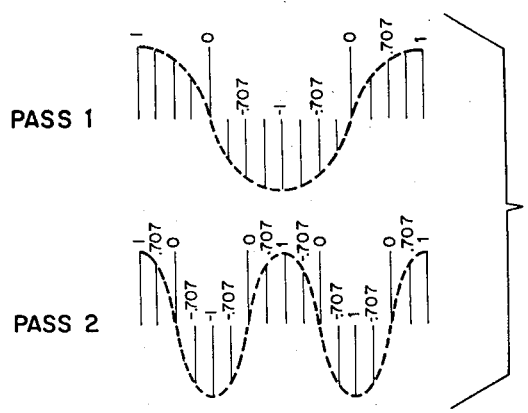
FIG. 3 is a family of sampling voltages with sinusoid envelopes showing the readout technique for two frequencies, $f$ and $2f$.

At 40 is a permanent source of binary-coded digital numbers which when read in appropriate succession represent the sampled amplitude of a sinusoid, cos $(kn\omega t)$. Likewise the sine function, sin $(kn\omega t)$ is obtained from the sine sample store 42. While the sine and cosine stores preferably comprise digital components, it is considered expedient to first illustrate in FIG. 2 the mechanical equivalent of the store and the readout from the store. In FIG. 2 a rotating switch armature 40$a$ successively samples the direct current voltage standing on each of the contacts 40$b$ of the switch. The amplitude and polarity of the succession of DC voltage are such that the envelope of the sampled voltages constitutes a sinusoid. If every switch position is sampled on the first pass of the armature, the sinusoid, of frequency $f$, will occur as shown in FIG. 3. If now in the second pass, the speed of the switch is doubled so that the armature samples only every other contact 40$b$, the sampled sinusoid of frequency $2f$ will occur as shown in FIG. 3. In the third pass the armature speed is tripled by programming to sample every third switch position in which case the sinusoid of frequency $3f$ will be generated. In the electrical equivalent of the mechanical switch of FIG. 2, the readout rate of the voltage samples will also be constant meaning that successive passes 1, 2, and 3 will occur respectively, at higher speeds.

The switch positions to be skipped or read are determined by the switch position control logic 54 driven by the 10—bit counter 50 through the 10—bit accumulator 52.

If the information read out from the sine and cosine stores are direct current voltages of measured amplitudes, the amplitude must, of course, be converted to binary coded digital numbers to be compatible with the digitized numbers with which they are to be multiplied.

Figure 4:
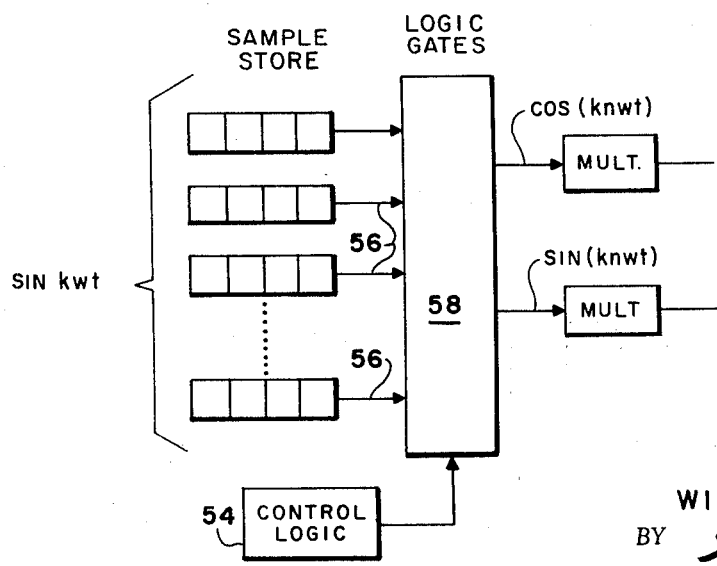
FIG. 4 shows a binary store for the system of FIG. 1.

Alternatively, and preferably, the sine and cosine information is stored in digital form, in FIG. 4, each digital word being stored at the predetermined addresses 56, corresponding to contacts 40b of FIG. 2, and gated out in proper sequence by known techniques in the logic gates 58. If 3 bits per words plus sign are satisfactory, four binary register stages or flip-flops at each address could be employed and programmed to hold the proper information for one point on a sine curve. The binary bits could, of course, be set into the storage addresses by manual switches. Information for only a single sinusoid can be employed, it being necessary to read out, under the control of logic 54, the sequence for two sine waves effectively 90° displayed in phase. Further, only the segment of a sine function from 0° to 90° need be stored if the switch logic imparts the proper algebraic sign.

In the embodiment illustrated in FIG. 1 a specific signal, $f(t)$, to be analyzed has been assumed along with one applicable set of parameters for the digital circuitry. For many practical signal waveforms at 10, it has been found that the samples can be quantized into three-bit pulse sign binary coded words without serious loss of accuracy. Further it is frequently found that 1,024 words are quite adequate for completely defining a useful signal segment. In the example of FIG. 1, the raw signal $f(t)$ is assumed to have a band of 0 to 1,000 Hz. Since $f(t)$ is filtered to two 500 Hz. bands, the period between samples is not more than 1.0 millisecond so that n6 information is lost on either band. Each Deltic fill time will then be 1.0 ms./sample × 1,024 samples or 1.024 seconds. It follows that the clock rate must be 1.024 mHz. Hence the clock 60 should have a clocking frequency of the order of 1 MHz. One new $a_n$ and one $b_n$ coefficient pair will be generated every 1.0 millisecond for 1.024 seconds. Higher signal frequencies and/or wider signal bands will logically require either higher clock rates or more parallel channels of operation. It should be pointed out that in FIG. 1 the zero time reference point for that part of the signal above 500 Hz. occurs 0.512 seconds later than the zero time reference point of the part below 500 Hz. This occurs since the two blocks of information were transferred to the Deltic store at different times. In general, the effect is of no consequence but can be eliminated by using two Deltic store units.

Obviously many modifications and variations of the present invention are possible in the light of the above teachings. It is therefore to be understood that within the scope of the appended claims the invention may be practiced otherwise than as specifically described.

What is claimed is:

1. The apparatus method of generating a Fourier coefficient for a signal segment of predetermined length, said method comprising:
   amplitude sampling the signal segment at regular intervals and converting said amplitude samples to digital form in a digital converter;
   time compressing said converted signal in a real time compressor to remove the dead time between samples;
   storing in a first storing means a set of discrete numbers at a series of addresses, which numbers when read out in a predetermined succession define the envelope of a sinusoid;
   multiplying in a digital multiplier pairs of values taken, respectively, from samples of said time-compressed signal segment and discrete values of said sinusoid; and
   summing in an accumulator a predetermined number of the products of the mentioned multiplications.

2. The method defined in claim 1 comprising further steps of:
   establishing in a second storing means a second set of discrete numbers at a second series of addresses which numbers when read out in a predetermined succession defines the envelope of a second sinusoid in quadrature with the first mentioned sinusoid;
   multiplying in a digital multiplier pairs of values taken, respectively, from samples of said signal segment and discrete numbers of said second sinusoid; and
   summing in an accumulator a predetermined number of the products of the second series of multiplications.

3. The apparatus method of generating digital numbers which represent the instantaneous values of the Fourier coefficients $a_n$ and $b_n$ of any segment of a time varying signal, $f(t)$, said method comprising:
   sampling the amplitude of said signal at a predetermined frequency;
   converting in a digital converter each sample to its approximate binary-coded digital equivalent,
   time compressing said converted signal in a real time compressor to remove the dead time between samples;
   storing first and second sets of digital numbers in first and second storage means, respectively, the elements of each set representing the magnitudes and polarities corresponding to equally spaced points over a full cycle of a sinusoid;
   reading out from said storage means two sequences of binary-coded digital numbers corresponding to amplitude samples of sine and cosine waves, respectively, of frequency $f$;
   then reading out from said storage means two sequences of binary-coded digital numbers corresponding to amplitude samples of sine and cosine waves of selected harmonic multiples, $n$, of frequency $f$;
   successively multiplying in a digital multiplier elements of said binary-coded signal sample sequences by elements of each sampled sinusoidal sequence and integrating in an accumulator the products to produce said coefficients $b_n$; and
   successively multiplying in said digital multiplier elements of said binary-coded signal sample sequences by elements of each sampled cosinusoidal sequence and integrating in said accumulator the products to produce said coefficients $a_n$.

4. In an apparatus for generating a Fourier coefficient for a signal segment of predetermined length, the combination comprising:
   an analog-to-digital converter for converting amplitude samples of the signal segment sampled at regular intervals to digital signals;
   time compression means coupled to said analog-to-digital converter for time compressing said digital signals to eliminate the dead time between samples;
   storage means for storing a set of discrete numbers at a series of addresses which numbers when read out in a predetermined succession define the envelope of a sinusoid;
   digital multiplier means coupled to said time compression means and to said storage means for multiplying pairs of values taken respectively, from samples of said time compressed segment and discrete values of said sinusoid; and
   an accumulator coupled to said digital multiplier means for summing a predetermined number of the products of said multiplications.

* * * * *

PO-1050
(5/69)

UNITED STATES PATENT OFFICE
CERTIFICATE OF CORRECTION

Patent No. 3,636,333      Dated January 18, 1972

Inventor(s) William E. Klund

It is certified that error appears in the above-identified patent and that said Letters Patent are hereby corrected as shown below:

Column 1, line 41, "handwidth" should read -- bandwidth --. Column 2, line 37, "$f_1(k)$" should read -- $f_1(kt)$ --; line 38, after "$f_2(kt$" insert -- ), --; line 47, "I/k" should read -- T/k --; line 65, "voltage" should read -- voltages --. Column 3, line 36, "n6" should read -- no --.

Signed and sealed this 27th day of February 1973.

(SEAL)
Attest:

EDWARD M. FLETCHER, JR.      ROBERT GOTTSCHALK
Attesting Officer               Commissioner of Patents